(12) United States Patent
Jang et al.

(10) Patent No.: US 9,258,737 B2
(45) Date of Patent: Feb. 9, 2016

(54) DEVICE AND METHOD FOR SIMULTANEOUSLY TRANSMITTING DATA IN MULTI-NETWORK

(71) Applicant: SK TELECOM CO., LTD., Seoul (KR)

(72) Inventors: Jae Seong Jang, Seongnam-si (KR); Kyung Hoon Kim, Bucheon-si (KR); Kyung Heum Han, Seongnam-si (KR); Ji Hoon Kim, Yongin-si (KR); Jin Soo Jeon, Suwon-si (KR); In Jang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 112 days.

(21) Appl. No.: 14/217,839

(22) Filed: Mar. 18, 2014

(65) Prior Publication Data

US 2015/0271702 A1    Sep. 24, 2015

Related U.S. Application Data

(63) Continuation of application No. PCT/KR2012/007458, filed on Sep. 18, 2012.

(30) Foreign Application Priority Data

Sep. 19, 2011 (KR) .......... 10-2011-0094023
Feb. 24, 2012 (KR) .......... 10-2012-0019249

(51) Int. Cl.
*H04W 4/00*       (2009.01)
*H04W 28/04*      (2009.01)
(Continued)

(52) U.S. Cl.
CPC ............ *H04W 28/04* (2013.01); *H04L 1/08* (2013.01); *H04L 1/1642* (2013.01)

(58) Field of Classification Search
None
See application file for complete search history.

(56) References Cited

U.S. PATENT DOCUMENTS

2004/0170181 A1*  9/2004  Bogdon .............. H04L 12/5692
                                                        370/400
2005/0286487 A1* 12/2005  Chitrapu ................ H04L 45/24
                                                        370/351

(Continued)

FOREIGN PATENT DOCUMENTS

JP    2007266790       10/2007
JP    2009207099 A      9/2009

(Continued)

OTHER PUBLICATIONS

International Search Report mailed Feb. 27, 2013 for PCT/KR2012/007458.

(Continued)

*Primary Examiner* — Chi H Pham
*Assistant Examiner* — Soon-Dong D Hyun
(74) *Attorney, Agent, or Firm* — Hauptman Ham, LLP

(57) ABSTRACT

A receiving device includes: a communication unit to receive a plurality of partial data divided from data to be transmitted through two or more connection networks; an information confirming unit to confirm (i) transmission order information and (ii) network transmission order information indicating related to a transmission order assigned to of the specific partial data among the plurality of partial data to be transmitted through a the specific connection network designated among the two or more connection networks; and the control unit to determine whether non-received partial data are lost based on at least one of the transmission order information and the network transmission order information.

18 Claims, 8 Drawing Sheets

(51) Int. Cl.
*H04L 1/16* (2006.01)
*H04L 1/08* (2006.01)

(56) References Cited

U.S. PATENT DOCUMENTS

| | | | |
|---|---|---|---|
| 2006/0203804 A1* | 9/2006 | Whitmore | H04L 12/5692 370/352 |
| 2011/0007693 A1* | 1/2011 | Frusina | H04L 5/003 370/329 |
| 2013/0304875 A1* | 11/2013 | Kaspar | H04W 76/025 709/219 |
| 2013/0304933 A1* | 11/2013 | Kim | H04L 65/60 709/231 |
| 2014/0286316 A1* | 9/2014 | Park | H04W 76/026 370/332 |
| 2014/0337473 A1* | 11/2014 | Frusina | H04L 5/003 709/217 |

FOREIGN PATENT DOCUMENTS

| | | |
|---|---|---|
| KR | 1020070041096 A | 4/2007 |
| KR | 1020070071668 A | 7/2007 |
| KR | 1020070116025 A | 12/2007 |
| KR | 1020090081639 A | 7/2009 |
| KR | 1020100001015 A | 1/2010 |
| KR | 1020110138139 A | 12/2011 |

OTHER PUBLICATIONS

Korean Notice of Allowance for application No. 10-2012-0019249 dated Aug. 30, 2013.

* cited by examiner

DEVICE AND METHOD FOR SIMULTANEOUSLY TRANSMITTING DATA IN MULTI-NETWORK

CROSS-REFERENCE TO RELATED APPLICATION

The present application is a continuation of International Application No. PCT/KR2012/007458 filed on Sep. 18, 2012, which is based on, and claims priority from KR Application Serial Number 10-2011-0094023, filed on Sep. 19, 2011, and 10-2012-0019249, filed on Feb. 24, 2012. The disclosures of the above-listed applications are hereby incorporated by reference herein in their entirety.

FIELD

The present disclosure relates a device and method of simultaneously transmitting or receiving devided partial data over multiple networks.

BACKGROUND

The statements in this section merely provide background information related to the present disclosure and do not constitute prior art.

Recently, communication services based on a plurality of mobile communication networks, such as WCDMA, CDMA, WiBro, and LTE (Long Term Evolution), have been provided. In addition, communication services based on a WLAN (WiFi) network that is a near field communication network have been provided.

Even in a multi-network environment in which several networks coexist as described above, it is known to transmit data through one selected from the multiple networks.

According to this known method, however, in case where transmitting or receiving large-capacity data, the inventor(s) has noted that the load factor of the one selected network is abruptly increased to limit smooth providing of the data service. In an environment where various wireless devices, such as smart phones and tablet PCs, are increasing and various large-capacity data services with respect to such wireless devices are also increasing, the inventor(s) has experienced that the above-described known method is improper.

In order to provide a smooth data service in a multi-network environment, the inventor(s) has noted that a simultaneous data transmission service, in which a transmitting device divides one piece of data into several pieces of partial data and simultaneously transmits the divided partial data to a receiving device through two or more networks of multiple networks, has been proposed.

On the other hand, in order to efficiently operate such a simultaneous data transmission service, the inventor(s) has experienced a need for schemes for promptly determining whether to continuously wait for reception of non-received partial data, which indicate data that the receiving device fails to be received among the partial data transmitted from the transmitting device to the receiving device, or to determine that the non-received data are lost during transmission and then request retransmission of the non-received data.

SUMMARY

In accordance with another aspect of the present disclosure, a receiving device comprises a communication unit, an information confirming unit and a control unit. The communication unit is configured to receive a plurality of partial data divided from data to be transmitted through two or more connection networks. The information confirming unit is configured to confirm (i) transmission order information indicating related to a transmission order assigned to each of the plurality of partial data to be transmitted through the two or more connection networks of specific partial data, which is received through a specific connection network among the two or more connection networks, with respect to the whole of the partial data, which are transmitted through the two or more connection networks, and (ii) network transmission order information indicating related to a transmission order assigned to of the specific partial data among the plurality of partial data to be transmitted through a the specific connection network designated among the two or more connection networks. And the control unit is configured to determine whether non-received partial data are lost based on at least one of the transmission order information and the network transmission order information.

In accordance with another aspect of the present disclosure, a transmitting device comprises a partial data selection unit, an information insertion unit and a communication unit. The partial data selection unit is configured to divide data into a plurality of partial data, and respectively select (a) specific partial data divided from the plurality of partial data to be transmitted through a specific connection network among by two or more connection networks, and (b) other partial data from the plurality of partial data to be transmitted through another connection network among the two or more connection networks. The information insertion unit is configured to insert, into the selected specific partial data and said other partial data, (i) transmission order information related to indicating a transmission order assigned to each of specific partial data, with respect to the whole of the plurality of partial data to be transmitted, which are transmitted through the two or more connection networks, and (ii) network transmission order information indicating related to a transmission order respectively assigned to the of the specific partial data or said other partial data to be transmitted through the specific connection network or said another connection network designated among the two or more connection networks into the specific partial data selected corresponding to a specific connection network. And the communication unit is configured to transmit the specific partial data and said other partial data selected by the two or more connection networks to a receiving device through the respective corresponding connection networks. According to one aspect of the present disclosure, there is provided a receiving device, which includes a communication unit configured to receive partial data obtained by dividing target transmission data through two or more connection networks; an information confirming unit configured to confirm transmission order information related to a transmission order of specific partial data, which is received through a specific connection network among the two or more connection networks, with respect to the whole of the partial data, which are transmitted through the two or more connection networks, and network transmission order information related to a transmission order of the specific partial data through the specific connection network; and a control unit configured to determine whether non-received partial data are lost based on the network transmission order information.

DETAILED DESCRIPTION

Hereinafter, various embodiments of the present disclosure will be described with reference to the accompanying drawings.

Figure 1:
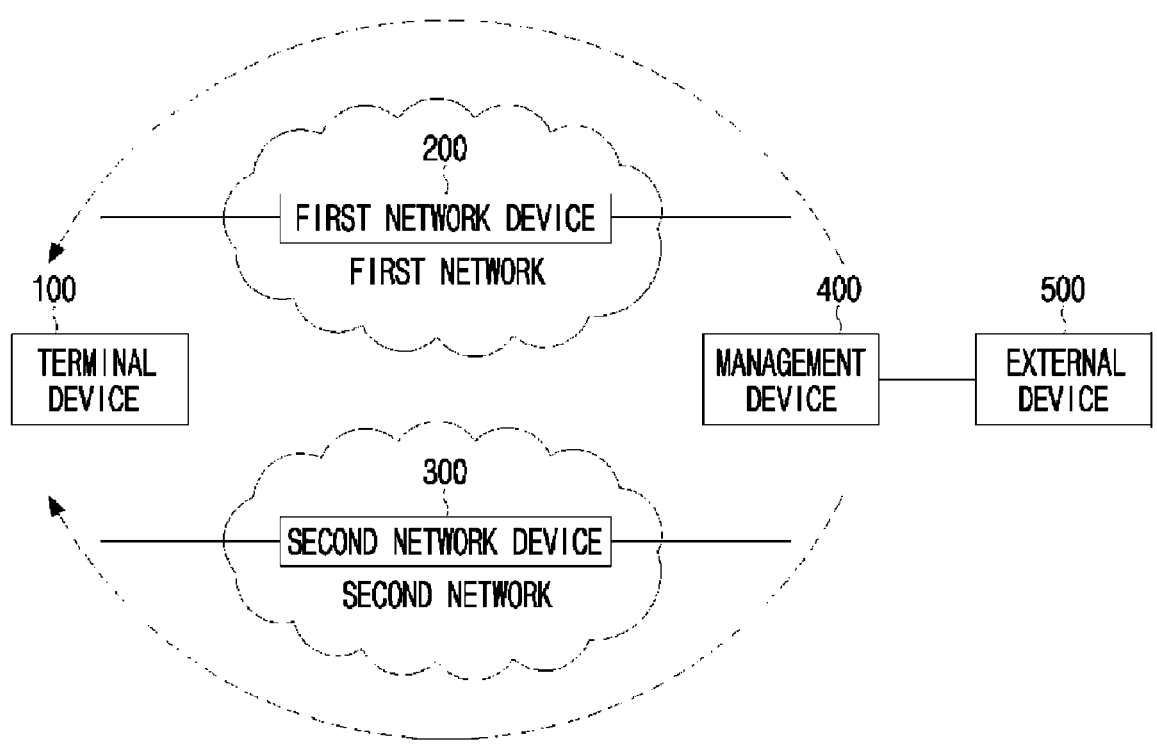
FIG. 1 is a schematic diagram of the configuration of a simultaneous data transmission system in a multi-network according to at least one embodiment of the present disclosure.

FIG. 1 is a schematic diagram of the configuration of a simultaneous data transmission system in a multi-network (or multiple networks) according to at least one embodiment of the present disclosure.

As illustrated in FIG. 1, a simultaneous data transmission system in a multi-network according to at least one embodiment of the present disclosure includes a terminal device 100, an external device 500 providing data services, such as Internet service, moving image providing service, and mVoIP service, to the terminal device 100, a first network device 200 connecting the terminal device 100 and the external device 500 to support a first network, a second network device 300 connecting the terminal device 100 and the external device 500 to support a second network, and a management device 400 positioned between the terminal device 100 and the external device 500 to support a simultaneous data transmission service for providing a data service provided by the external device 500 using both the first network device 200 and the second network device 300. Other components of the simultaneous data transmission system such as the terminal equipment 100, the first network device 200, the second network device 300 and management device 400 are implemented by one or more processors and/or application-specific integrated circuits (ASICs).

Here, the terminal device 100 is a user device for using a data service provided from the external device 500, and corresponds to, for example, a mobile terminal, a personal computer (PC), a notebook computer, a tablet PC, or a PDA, but is not limited thereto. Any device that transmits or receives data through both the first network and the second network is called a terminal device.

Further, the first or second network is, for example, a network of WCDMA, CDMA, WiBro, WLAN (WiFi), or LTE (Long Term Evolution), but is not limited thereto. Any network that provides wireless communication is the first or second network.

In relation to this, if the first network is a 3G network, the first network device 200 corresponds to a GGSN (Gateway GPRS Support Node) of a 3G network. Further, if the second network is WiFi that is one of local area networks, the second network device 300 corresponds to an access point (AP).

Further, the management device 400 is called a server device for supporting a simultaneous data transmission service with respect to the terminal device 100, and is positioned on the first or second network or on a separate network from the first and second networks to support the simultaneous data transmission service.

On the other hand, in the case of an uplink to transmit data from the terminal device 100 to the management device 400, the terminal device 100 becomes a transmitting device, and the management device 400 becomes a receiving device. In contrast, in the case of a downlink to transmit data from the management device 400 to the terminal device 100, the terminal device 100 becomes a receiving device, and the management device 400 may become a transmitting device.

The simultaneous data transmission service provided according to the present disclosure simultaneously transmits partial data that are obtained by dividing one piece of data using multiple networks (e.g., 3G and WiFi). A receiving device restores the target transmission data by receiving all the partial data received through the multiple networks (e.g., 3G and WiFi) without loss and combining the partial data to meet the division order.

However, since network qualities (throughput, delay, and loss) between the respective networks are different from each other and the network states of the respective networks are variable in real time, there is a difference between latencies of the respective networks. Accordingly, even if the respective partial data are simultaneously transmitted using multiple networks (e.g., 3G and WiFi), there occurs a difference between reception time points of the partial data that are actually received through the respective networks (e.g., 3G and WiFi) in the receiving device due to the difference between the latencies of the respective networks. That is, if there occurs a difference between reception time points of the partial data that are actually received through the respective networks, the transmission order of the partial data transmitted at the transmitting device and the reception order of the partial data received at the receiving device do not coincide with each other.

Next, it is performed to determine whether non-received partial data, indicating data that are not currently received or fail to be received, is delayed and thus shall be received after a predetermined time or the non-received partial data are lost and retransmission thereof is required.

According to the TCP retransmission rule, if duplicate acknowledgement of the non-received partial data is received a specific number of times (e.g., three times) from the receiving device, it is determined that the non-received partial data are lost during transmission and retransmission thereof is performed. Accordingly, even in the case where transmission of the non-received partial data is merely delayed, the retransmission thereof is performed to cause the occurrence of the duplicate transmission of the same partial data.

On the other hand, in the receiving device, the respective partial data received through the respective networks are temporarily stored in a receiving buffer and are realigned according to the reception order. In the case where the partial data are stored in the receiving buffer, the duplicate acknowledgement does not occur.

If the partial data of the specific order is not received, transfer of the partial data having a later order than the non-received partial data to an upper layer is waited for a predetermined transfer waiting time, and only in the case where the non-received partial data is not received until the transfer waiting time elapses, the partial data having the lower order is transferred to the upper layer. Through this, unnecessary duplicate acknowledgement of the non-received partial data, of which the transmission is delayed, is prevented from occurring.

However, according to the TCP rule, if a specific RTO (Retransmission Time-Out) time elapses in a state where there is no reception response to the partial data due to the realignment and transfer waiting of the partial data in the receiving device, the retransmission of the corresponding partial data is performed, and in this case, it is considered that the same data may be duplicately transmitted.

Accordingly, in the simultaneous data transmission service, it is necessary to promptly determine whether the non-received partial data that are not currently received in the receiving device are in a transmission delay state or the non-received partial data are lost and retransmission thereof is required.

According to at least one embodiment of the present disclosure, in an environment where the simultaneous data transmission service is provided, not only transmission order information related to the overall transmission order regardless of the multi-network (or multiple networks) but also network transmission order information related to an independent transmission order by networks are inserted into the respective partial data.

A configuration that effectively reduces waiting time is proposed on the receiving side, which confirms whether non-received partial data occurs based on the transmission order information and promptly determine whether the non-received partial data are lost based on the network transmission order information included in the partial data that are transmitted after the non-received partial data when the non-received partial data occurs.

Hereinafter, for convenience in explanation, explanation will be made based on a downlink in which the management device 400 becomes a transmitting device and the terminal device 100 becomes a receiving device. However, the present disclosure is also applied to an uplink in the same manner.

If target transmission data that is to be transmitted from the external device 500 to the terminal device 100 is received, the management device 400 divides the received data into one or more partial data.

In this case, the management device 400 gives or inserts division order information into the respective partial data so that the partial data that are obtained by dividing the target transmission data are combined to restore the original target transmission data.

Then, the management device 400 selects the respective divided partial data by connection networks based on a predetermined data transmission rate by connection networks.

Then, the management device 400 transmits the respective partial data selected by connection networks (e.g., WiFi and 3G) through the respective connection networks (e.g., WiFi and 3G). The first network device 200 transmits first partial data transmitted from the management device 400 to the terminal device 100, and the second network device 300 transmits second partial data transmitted from the management device 400 to the terminal device 100.

In this case, the management device 400 gives or inserts the transmission order information related to the overall transmission order regardless of the type of the network into the partial data that are transmitted through the connection networks (e.g., WiFi and 3G).

Figure 7:
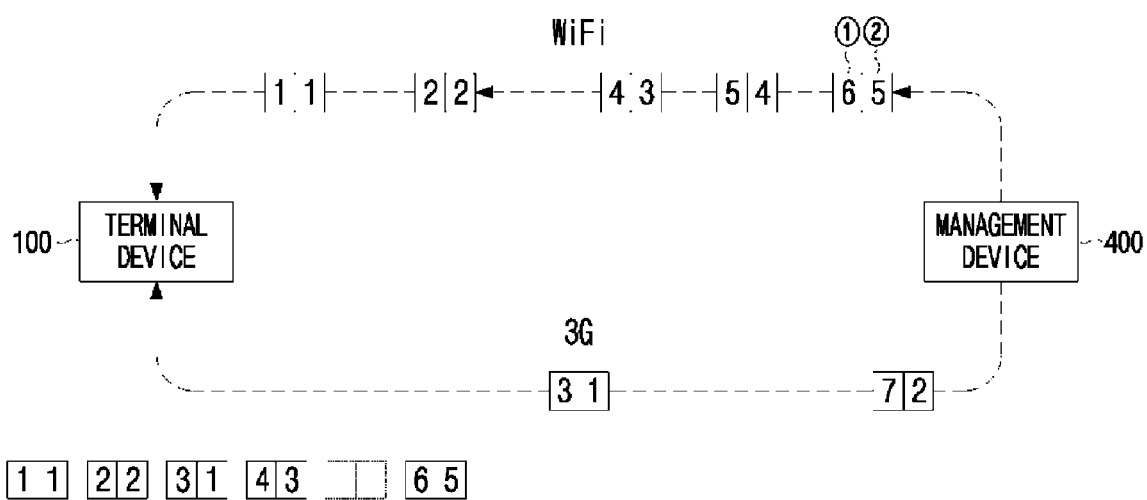
FIGS. 7 and 8 are exemplary schematic diagrams of simultaneously transmitting partial data in a multi-network according to at least one embodiment of the present disclosure.

For example, as illustrated in FIG. 7, the management device 400 inserts transmission order information 1 and 2 into first and second partial data that are transmitted to a second network, that is, a WiFi network, and insert transmission order information 3 into third partial data that is transmitted to a first network, that is, a 3G network. Further, the management device 400 inserts transmission order information 4, 5, and 6 into fourth, fifth, and sixth partial data that are transmitted to the WiFi network, and insert transmission order information 7 into seventh partial data that is transmitted to the 3G network.

In this case, the transmission order information and the division order information, which are given or inserted into the respective partial data, are equal to each other, or are different from each other.

Further, the management device 400 inserts the network transmission order information related to the order of transmitting specific partial data through a specific connection network into the specific partial data selected corresponding to the specific connection network.

Here, the specific connection network is one connection network selected from two or more connection networks, or is each of the two or more connection networks.

That is, the management device 400 inserts the network transmission order information related to the independent transmission order by two or more connection networks.

For example, as illustrated in FIG. 7, the management device 400 inserts network transmission order information 1, 2, 3, 4, and 5 related to the transmission order through the WiFi network into the respective partial data of transmission order information 1, 2, 4, 5, and 6, which are selected to be transmitted to the WiFi network, and inserts network transmission order information 1 and 2 related to the transmission order through the 3G network into the respective partial data of transmission order information 3 and 7, which are selected to be transmitted to the 3G network, to correspond to the 3G and WiFi networks.

For example, in a region ① of the partial data corresponding to the transmission order information 6, information 6 is included as transmission order information according to the transmission order from the management device 400 regardless of the 3G and WiFi networks, and in a region ② information 5 is included as network transmission order information according to the transmission order from the management device 400 through WiFi.

The terminal device 100 restores the target transmission data through combination of the partial data received through two or more networks based on the division order information.

More specifically, the terminal device 100 receives the first partial data from the first network device 200 and receives the second partial data from the second network device 300 through two or more connection networks (e.g., WiFi and 3G).

The terminal device 100 recognizes the partial data having the same identification information (e.g., virtual IP) indicating that the partial data are obtained by dividing one piece of data based on the identification information (e.g., virtual IP) included in several partial data being received, and realign the partial data in a receiving buffer based on the transmission order information included in the corresponding partial data.

In this case, the terminal device 100 confirms the specific partial data having the transmission order information after the transmission order information of the non-received partial data and confirms the network transmission order information of the specific partial data to correspond to the respective partial data received through two or more connection networks (e.g., 3G and WiFi).

Then, the terminal device 100 determines whether the non-received partial data are lost based on the confirmed network transmission order information.

More specifically, referring to FIG. 7, the terminal device 100 confirms reception of the partial data of transmission order information 1, 2, 3, and 4 and the partial data of transmission order information 6 through the respective connection networks as the result of the realignment based on the transmission order information corresponding to the respective partial data received through two or more connection networks (e.g, 3G and WiFi). In other words, the terminal device 100 confirms non-reception of the partial data of transmission order information 5 based on the result of the realignment and the partial data having transmission order information 6 after transmission order information (e.g., 5) of the non-received partial data.

The terminal device 100 confirms the network transmission order information from the partial data that are confirmed to have transmission order information 6 after the transmission order information of the non-received partial data.

In this case, as illustrated in FIG. 7, in the partial data including transmission order information 6, the network transmission order information 5 is also included therein.

Here, the network transmission order information 5 means that the transmission order of the partial data of the transmission order information 6 is transmitted, by the management device 400, in the fifth order through the WiFi network.

When the network transmission order information that is confirmed from the partial data of the last transmission order information (e.g., assuming it's transmission order referred to as n−1) among the partial data pre-received to correspond to the specific connection network is not consecutive with the network transmission order information (e.g., assuming it's transmission order referred to as n+1) that is confirmed from the specific partial data, the terminal device 100 confirms (or checks, or calculates) the number of the partial data that are transmitted between the partial data including the last transmission order information and the specific partial data based on the network transmission order information that is confirmed from the partial data of the last transmission order information and the specific partial data, and when the number (i.e., quantity) of the partial data transmitted is equal to the number (i.e., quantity of partial data failing to receive) of the non-received partial data, the terminal device 100 determines that the non-received partial data are lost.

That is, referring to FIG. 7, the terminal device 100 determines whether the network transmission order information 3 that is confirmed from the partial data of the last transmission order information 4 among the partial data of the transmission order information 1, 2, and 4 pre-received corresponding to the WiFi network and the network transmission order information 5 that is confirmed from the partial data of the transmission order information 6 are consecutive.

When the network transmission order information 3 that is confirmed from the partial data of the last transmission order information 4 and the network transmission order information 5 that is confirmed from the partial data of the transmission order information 6 are not consecutive, the terminal device 100 confirms the transmission number of the partial data that are transmitted between the partial data of the last transmission order information 4 and the partial data of the transmission order information 6 based on the network transmission order information 3 and 5 that are confirmed from the partial data of the last transmission order information 4 and the partial data of the transmission order information 6. Accordingly, the terminal device 100 can confirm that the transmission number of the partial data between the network transmission order information 5 and the network transmission order information 3 is "1".

Then, when the transmission number of the confirmed partial data is equal to the number of the non-received partial data, the terminal device 100 determines that the non-received partial data are lost.

As a result, since the number of non-received partial data, that is, the number of partial data of the transmission order information 5, is "1" and the transmission number of the confirmed partial data between the network transmission order information 5 and the network transmission order information 3 is "1", which are the same, the terminal device 100 can immediately determine that the non-received partial data of the network transmission order information 5, which is transmitted through the WiFi network, is lost.

In this case, the terminal device 100 requests retransmission of the non-received partial data 5 that are determined to be lost.

For example, when it is determined that the non-received partial data of the transmission order information 5 are lost as shown in FIG. 7, the terminal device 100 immediately transfers the partial data of the transmission order information 6 after the partial data of the transmission order information 5, which is determined to be lost, from the receiving buffer to an upper layer, that is, a function unit (control unit 130 in FIG. 3) that performs transmission of the reception response according to TCP and combination of the partial data.

Through this, since the partial data of the transmission order information 6 is transferred to the upper layer in a state where the partial data of the transmission order information 5 is not received, the terminal device 100 generates a reception response that includes retransmission request for the non-received partial data of the transmission order information 5, for example, duplicate acknowledgement, to correspond to the partial data of the transmission order information, and provide the reception response to the external device 500 through the transmitting device, that is, the management device 400.

On the other hand, when the network transmission order information that is confirmed from the partial data of the last transmission order information among the partial data pre-received to correspond to the specific connection network and the network transmission order information that is confirmed from the specific partial data are consecutive, the terminal device 100 recognizes that the non-received partial data are transmitted through the remaining connection network except for the specific connection network among the two or more connection networks, and waits for reception of the non-received partial data.

That is, FIG. 7 shows an example in which the partial data of the transmission order information 5 is transmitted through the WiFi network. However, when the partial data of the transmission order information 5 is transmitted to the 3G network and is lost, the terminal device 100 can confirm that the network transmission order information that is confirmed from the partial data of the transmission order information 6 is "4", and the network transmission order information 3 that is confirmed from the partial data of the last transmission order information 4 and the network transmission order information 4 that is confirmed from the partial data of the transmission order information 6 are consecutive.

When the network transmission order information 3 that is confirmed from the partial data of the last transmission order information 4 and the network transmission order information 4 that is confirmed from the partial data of the transmission order information 6 are consecutive, the terminal device 100 recognizes that the non-received partial data of the transmission order information 5 is transmitted through the remaining connection network, that is, the 3G network, except for the specific connection network, that is, the WiFi network, in which the partial data of the transmission order information 6 is received, among the two or more connection networks (e.g., 3G and WiFi), and waits for general reception according to the TCP protocol.

Figure 8:
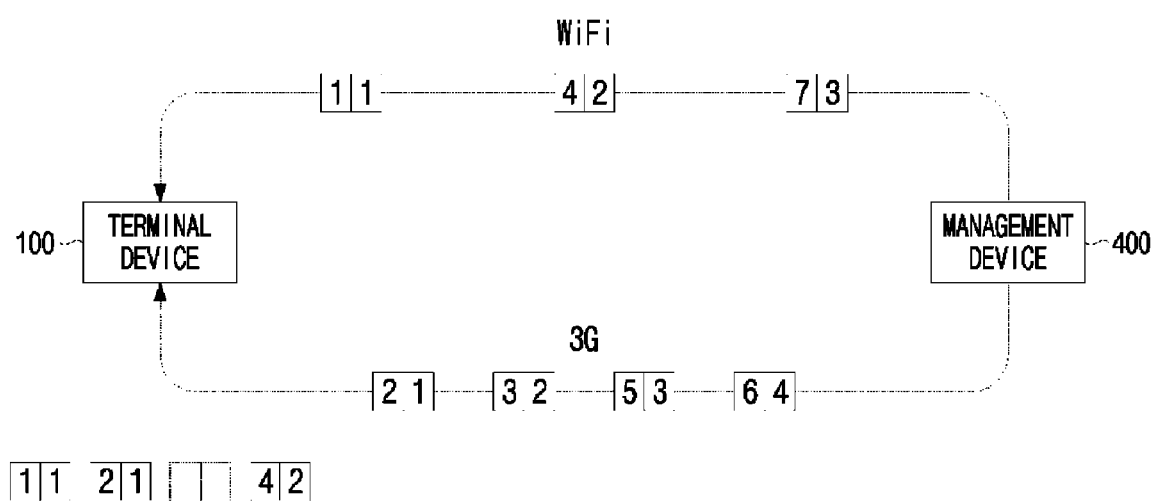

Referring to FIG. 8, another embodiment will be described. The terminal device 100 confirms reception of the partial data of transmission order information 1 and 2 and the partial data of transmission order information 4 through the respective connection networks as the result of the realignment based on the transmission order information corresponding to the respective partial data received through two or more connection networks (e.g, 3G and WiFi). In other words, the terminal device 100 confirms non-reception of the partial data of transmission order information 3 based on the result of the realignment and the partial data having transmission order information 4 after transmission order information 3 of the non-received partial data.

The terminal device 100 confirms the network transmission order information from the partial data that are confirmed to have transmission order information 4 after the transmission order information of the non-received partial data.

In this case, as illustrated in FIG. 8, in the partial data of transmission order information 4, "2" is included as the network transmission order information.

Here, the network transmission order information 2 means that the transmission order of the partial data of the transmission order information 4 from the management device 400 through the WiFi network is the second order.

The terminal device 100 determines whether the network transmission order information 1 that is confirmed from the partial data of the last transmission order information 1 pre-received corresponding to the WiFi network and the network transmission order information 2 that is confirmed from the partial data of the transmission order information 4 are consecutive.

When the network transmission order information 1 that is confirmed from the partial data of the last transmission order information 1 and the network transmission order information 2 that is confirmed from the partial data of the transmission order information 4 are consecutive, the terminal device 100 recognizes that the non-received partial data of the transmission order information 3 is transmitted through the remaining connection network, that is, the 3G network, except for the received specific connection network of the partial data of the transmission order information 4, that is, the WiFi network, among two or more connection networks (e.g., 3G and WiFi), and waits for reception of the non-received partial data.

As described above, it is described that the management device 400 transmits the partial data that are obtained by dividing the target transmission data to the terminal device 100 based on the downlink.

In addition, according to the simultaneous data transmission service to which the present disclosure is applied, the terminal device 100 transmits the partial data that are obtained by dividing the target transmission data to the management device 400 during uplink, and the management device 400 realigns and combines the partial data. Accordingly, (i) the partial data division, (ii) the insertion of the transmission order information and the network transmission order information, and (iii) the partial data transmission, which are performed by the management device 400 as the transmitting device during the downlink, are also performed by the terminal device 100 as the transmitting device during the uplink. Further, the confirmation of the network transmission order information from the partial data having the transmission order information after the transmission order information of the non-received partial data, the determination of the loss of the non-received partial data, and the retransmission request, which are performed by the terminal device 100 as the receiving device during the downlink, can be performed by the management device 400 as the receiving device during the uplink.

Figure 2:
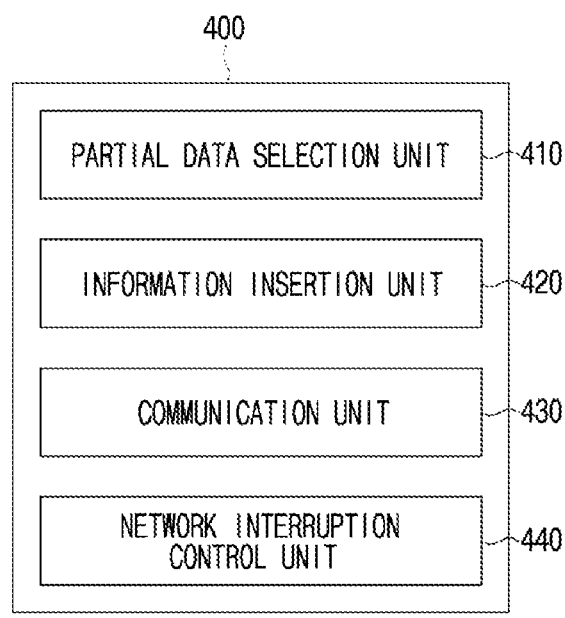
FIG. 2 is a schematic block diagram of the configuration of a simultaneous data transmission device in a multi-network according to at least one embodiment of the present disclosure.

Hereinafter, referring to FIG. 2, the configuration of the multi-network based simultaneous data transmission device, that is, the transmitting side device, according to at least one embodiment of the present disclosure will be described in more detail. For convenience in explanation, explanation will be made based on a downlink in which the transmitting device is regarded as the management device 400. However, the present disclosure is not limited thereto, but can also be applied to a case where the terminal device 100 becomes the transmitting device in the same manner.

The management device 400 includes a partial data selection unit 410 configured to select partial data obtained by dividing target transmission data by two or more connection networks, an information insertion unit 420 configured to insert network transmission order information related to a transmission order of specific partial data through a specific connection network into the specific partial data that is selected corresponding to the specific connection network, and a communication unit 430 configured to transmit the partial data selected by two or more connection networks through the respective connection networks. Other components of the management device 400, such as the partial data selection unit 410, the information insertion unit 420 and the communication unit 430 are implemented by one or more processors and/or application-specific integrated circuits (ASICs).

The multi-network based simultaneous data transmission device according to at least one embodiment of the present disclosure, that is, the management device 400, further includes a network interruption control unit 440. The network interruption control unit 440 is also implemented by one or more processors and/or application-specific integrated circuits (ASICs).

The partial data selection unit 410 selects the partial data obtained by dividing the target transmission data based on the data transmission rate (e.g., 3G:WiFi=2:5) by two or more predetermined connection networks.

That is, When the target transmission data to be transmitted to the terminal device 100 is received, the partial data selection unit 410 divides the received data into partial data. In this case, the partial data selection unit 410 gives or inserts division order information into the respective partial data so that the partial data that are obtained by dividing the target transmission data are combined to restore the original target transmission data.

The information insertion unit 420 inserts the network transmission order information related to the transmission order of the specific partial data through the specific connection network into the specific partial data selected corresponding to the specific connection network.

More specifically, the information insertion unit 420 gives or inserts the transmission order information related to the overall transmission order regardless of the type of the network into the partial data that are transmitted through the connection networks (e.g., WiFi and 3G).

For example, as illustrated in FIG. 7, the information insertion unit 420 gives or inserts transmission order information 1 and 2 into first and second partial data that are transmitted to a second network, that is, a WiFi network, and give or insert transmission order information 3 into third partial data that is transmitted to a first network, that is, a 3G network. Further, the management device 400 gives or inserts transmission order information 4, 5, and 6 into fourth, fifth, and sixth partial data that are transmitted to the WiFi network, and give or insert transmission order information 7 into seventh partial data that is transmitted to the 3G network.

In this case, the transmission order information and the division order information, which are given or inserted into the respective partial data, may be equal to each other, or may be different from each other.

Further, the information insertion unit 420 inserts the network transmission order information related to the order of transmitting specific partial data through a specific connection network into the specific partial data selected corresponding to the specific connection network.

Here, the specific connection network may be one connection network selected from two or more connection networks, or may be each of the two or more connection networks.

That is, the information insertion unit 420 may insert the network transmission order information related to the independent transmission order by two or more connection networks.

For example, as illustrated in FIG. 7, the information insertion unit 420 may give or insert network transmission order information 1, 2, 3, 4, and 5 related to the transmission order through the WiFi network into the respective partial data of transmission order information 1, 2, 4, 5, and 6, which are selected to be transmitted to the WiFi network, and may give or insert network transmission order information 1 and 2 related to the transmission order through the 3G network into the respective partial data of transmission order information 3 and 7, which are selected to be transmitted to the 3G network, to correspond to the 3G and WiFi networks.

The communication unit 430 is called a communication module which communicates with the first network device 200 using the 3G network, and communicates with the second network device 300 using the WiFi network.

The communication unit 430 transmits the partial data selected by two or more connection networks, that is, the partial data including the partial data into which the transmission order information and the network transmission order information are inserted, through the corresponding connection network.

On the other hand, reception of the partial data corresponding to the specific connection network (e.g., WiFi) that is determined to be in an abnormal state may be interrupted using the result of determining whether the non-received partial data are lost.

When needed, the network interruption control unit 440 functions to reopen the use of the specific connection network (e.g., WiFi) with respect to the terminal device 100 that interrupts the reception of the partial data corresponding to the specific connection network (e.g., WiFi).

That is, in the case of reopening the interrupted transmission of the partial data through the specific connection network using the result of determination of whether the non-received partial data are lost, the network interruption control unit 440 requests the receiving device to reopen the specific connection network, and when a confirmation message is received through the specific connection network, it transmits a response message corresponding to the confirmation message.

More specifically, the terminal device 100 may interrupt the reception of the partial data corresponding to the specific connection network (e.g., WiFi) by interrupting the use of the specific connection network (e.g., WiFi) that is determined to be in an abnormal state as described above, and may notify the management device 400 according to at least one embodiment of the present disclosure of the use interruption of the WiFi network.

Through this, the network interruption control unit 440 recognizes that the terminal device 100 interrupts the use of the specific connection network (e.g., WiFi).

In this case, at least one of the partial data selection unit 410, the information insertion unit 420, and the communication unit 430 reflects the user interruption of the specific connection network (e.g., WiFi) in performing selection of the partial data, information insertion, and transmission according to the simultaneous data transmission service to the terminal device 100, and would not transmit the partial data through the specific connection network (e.g., WiFi).

In the case of transmitting the partial data to the terminal device 100 through the interrupted specific connection network (e.g., WiFi), the network interruption control unit 440 requests the terminal device 100 to reopen the specific connection network (e.g., WiFi), and when a corresponding confirmation message is received through the specific connection network (e.g., WiFi), it transmits a response message that corresponds to the received confirmation message to the terminal device 100.

When the response message is normally received through the specific connection network (e.g., WiFi), the terminal device 100 reopens the use of the specific connection network (e.g., WiFi) of which the use is interrupted, and thus releases the reception interruption of the partial data corresponding to the specific connection network (e.g., WiFi).

Figure 3:
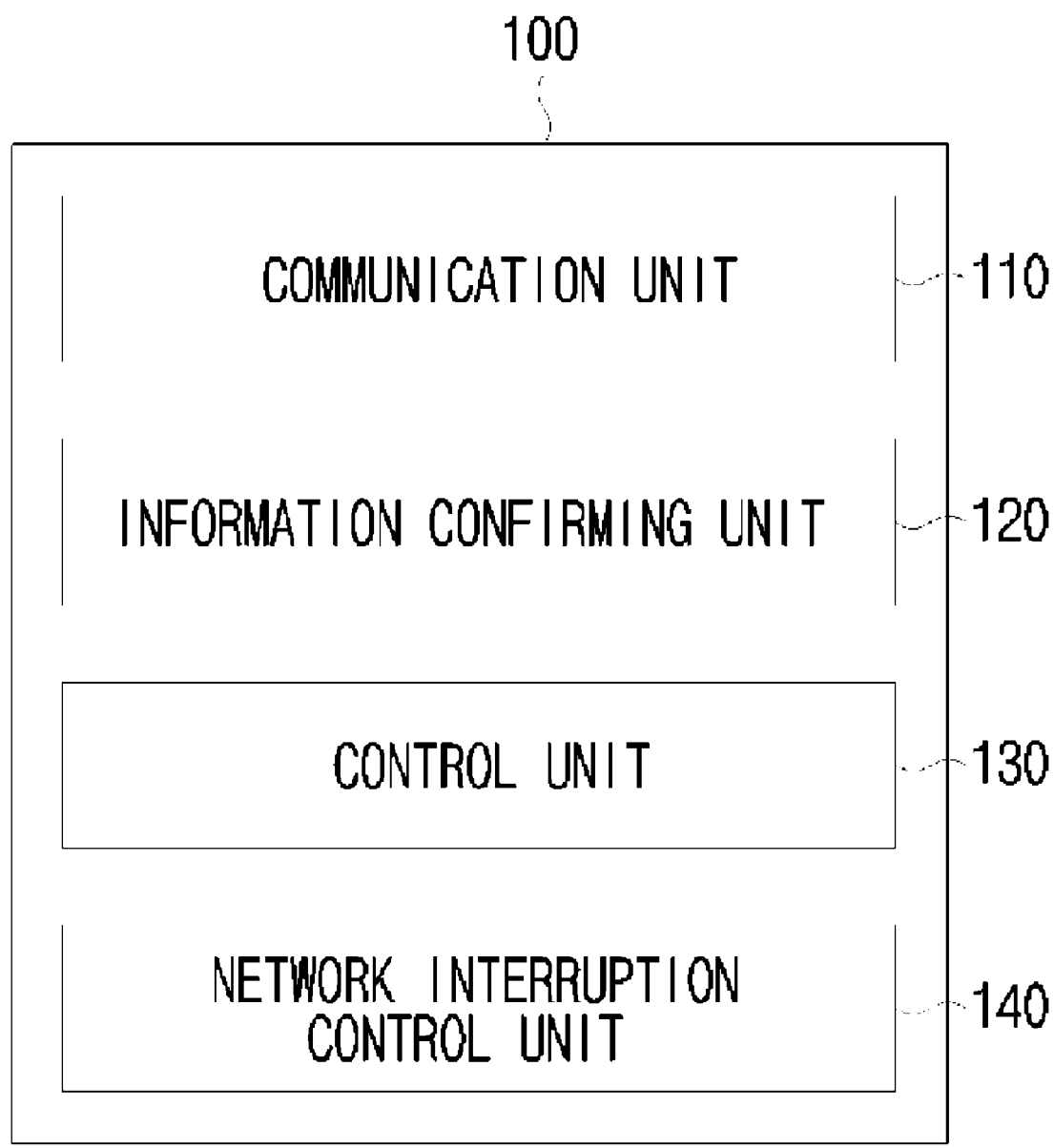
FIG. 3 is a schematic block diagram of the configuration of a simultaneous data receiving device in a multi-network according to at least one embodiment of the present disclosure.

Hereinafter, referring to FIG. 3, the configuration of a receiving device that receives partial data in a simultaneous data transmission service in a multi-network according to at least one embodiment of the present disclosure will be described in more detail. For convenience in explanation, explanation will be made based on a downlink in which the terminal device 100 is the receiving device. However, the present disclosure is not limited thereto, but is also applied to a case where the management device 400 is the receiving device based on an uplink in the same manner.

The terminal device 100 according to at least one embodiment of the present disclosure includes a communication unit 110 configured to receive partial data (herein, "partial data" means a plurality of partial data divided from data (i.e., target transmission data) to be transmitted) obtained by dividing target transmission data through two or more connection networks; an information confirming unit 120 configured to confirm specific partial data having transmission order information after transmission order information of non-received partial data corresponding to respective partial data that are received through two or more connection networks and to confirm network transmission order information related to a transmission order of the specific partial data through a specific connection network through which the specific partial data is received; and a control unit 130 configured to determine whether the non-received partial data are lost based on the network transmission order information. Other components of the terminal equipment 100, such as the communication unit 110, the information confirming unit and the control unit 130 are implemented by one or more processors and/or application-specific integrated circuits (ASICs).

On the other hand, the terminal device 100 further includes a network interruption control unit 140. The network interruption control unit 140 is also implemented by one or more processors and/or application-specific integrated circuits (ASICs).

The communication unit 110 is a communication module which communicates with the first network device 200 using the 3G network and communicates with the second network device 300 using the WiFi network, and receives the partial data from the transmitting device 400 as described above through two or more connection networks (e.g., 3G and WiFi).

The terminal device 100 recognizes the partial data having the same identification information (e.g., virtual IP) indicating that the partial data are obtained by dividing one piece of data based on the identification information (e.g., virtual IP) included in several partial data being received, and realign the partial data in a receiving buffer (not illustrated) based on the transmission order information included in the corresponding partial data.

The transmission information confirming unit 120 confirms the specific partial data having the transmission order information after the transmission order information of the non-received partial data, and confirms the network transmission order information indicating the transmission order assigned to the specific partial data through the specific connection network through which the specific partial data is received. The transmission information confirming unit 120 also confirms, in at least one embodiment, transmission order information indicating a transmission order assigned to each of the plurality of partial data to be transmitted through two or more connection networks.

More specifically, referring to FIG. 7, the transmission information confirming unit 120 confirms reception of the respective partial data corresponding to transmission order information 1, 2, 3, and 4 and the partial data of transmission order information 6 through the respective connection networks among two or more connection networks. Further, the transmission information confirming unit 120 confirms the network transmission order information from the partial data that are confirmed to have transmission order information 6 after the transmission order information of the non-received partial data.

In this case, as illustrated in FIG. 7, in the partial data including the transmission order information 6, the network transmission order information 5 is also included therein.

Here, the network transmission order information 5 means that the transmission order of the partial data of the transmission order information 6 from the transmitting device 400 through the WiFi network is the fifth order.

Here, the control unit 130 determines whether the non-received partial data are lost based on the network transmission order information that is confirmed by the transmission information confirming unit 120.

More specifically, when the network transmission order information that is confirmed from the partial data of the last transmission order information among the partial data pre-received to correspond to the specific connection network are not consecutive with the network transmission order information that is confirmed from the specific partial data, the control unit 130 confirms the transmission number of the partial data that are transmitted between the partial data of the last transmission order information and the specific partial data based on the network transmission order information that is confirmed from the partial data of the last transmission order information and the specific partial data, and when the transmission number of the partial data is equal to the number of the non-received partial data, the control unit 130 determines that the non-received partial data are lost. That is, the control unit 130 obtains a difference between the corresponding network transmission order information of other pre-received partial data and the network transmission order information of the specific partial data, and then determines that the non-received partial data are lost when the obtained difference is equal to the number (i.e., quantity of partial data failing to receive, or quantity of lost data) of the non-received partial data.

In this case, the control unit 130 requests retransmission of the non-received partial data that are determined to be lost.

On the other hand, when the network transmission order information that is confirmed from the partial data of the last transmission order information among the partial data pre-received to correspond to the specific connection network are consecutive with the network transmission order information that is confirmed from the specific partial data, the control unit 130 recognizes that the non-received partial data are transmitted through the remaining connection network except for the specific connection network among the two or more connection networks, and waits for reception of the non-received partial data. That is, the control unit recognizes that the non-received partial data is received through another connection network (i.e., the remaining connection network except for the specific connection network) among the two or more connection networks and determine that the non-received partial data are not lost when the network transmission order information of the specific partial data is consecutive with the network transmission order information of other pre-received partial data, wherein the specific partial data are received through the specific connection network and said other pre-received partial data were previously received through the specific connection network.

Then, the control unit 130 may restore the original target transmission data through combination of the respective partial data that are transferred or received from the receiving buffer (not illustrated) according to the corresponding division order information.

When it is determined that the specific connection network (e.g., WiFi) is in an abnormal state based on the determination of whether the partial data corresponding to the specific connection network are lost, the network interruption control unit 140 functions to temporarily interrupt the use of the corresponding specific connection network (e.g., WiFi).

For example, when the number of the non-received partial data that are determined to be lost corresponding to the WiFi network as described above exceeds the number of specific abnormal states, the network interruption control unit 140 may determine that the WiFi network belongs to a predetermined specific abnormal state.

Further, the network interruption control unit 140 measures throughput of the WiFi network based on the number of partial data that are received corresponding to the WiFi network and the number of non-received partial data that are determined to be lost as described above during a specific measurement time, and may determine that the WiFi network belongs to the predetermined specific abnormal state when the measured throughput of the WiFi network is lower than the specific abnormal state value.

As described above, when it is determined that the WiFi network belongs to the specific abnormal state, the network interruption control unit 140 may interrupt the reception of the partial data corresponding to the WiFi network.

That is, the network interruption control unit 140 may interrupt the reception of the partial data corresponding to the specific connection network (e.g., WiFi) by interrupting the use of the specific connection network (e.g., WiFi) that is determined to be in an abnormal state, and in this case, the network interruption control unit 140 may notify the transmitting device 400 of the use interruption of the WiFi network.

Further, when it is requested to reopen the specific connection network (e.g., WiFi) through which the reception of the partial data is interrupted, the network interruption control unit 140 may transmit a confirmation message to the transmitting device 400 through the specific connection network and may release the reception interruption of the partial data corresponding to the specific connection network.

On the other hand, according to another embodiment of the present disclosure, a network interruption control unit 440 of the management device 400 may perform the function that is performed by the network interruption control unit 140 of the terminal device 100, and the network interruption control unit 140 of the terminal device 100 may perform the function that is performed by the network interruption control unit 440 of the management device 400.

For example, the terminal device 100 provides information on the determination of whether the non-received partial data are lost as described above to the management device 400, and if the network state of the specific connection network (e.g., WiFi) belongs to the predetermined specific abnormal state based on the number of non-received partial data that are determined to be lost corresponding to the specific connection network (e.g., WiFi), the transmitting device 400 may interrupt the transmission of the partial data corresponding to the specific connection network (e.g., WiFi) in various ways, such as interruption of the use of the specific connection network (e.g., WiFi) by the terminal device 100.

Further, in the case of transmitting the partial data to the terminal device 100 through the specific connection network (e.g., WiFi) through which the transmission of the partial data is interrupted, the transmitting device 400 may request the terminal device 100 to reopen the specific connection network (e.g., WiFi), and when a corresponding confirmation message is normally received through the specific connection network (e.g., WiFi), it may release the transmission interruption of the partial data corresponding to the specific connection network (e.g., WiFi) through reopening the interrupted use of the specific connection network (e.g., WiFi).

Figure 4:
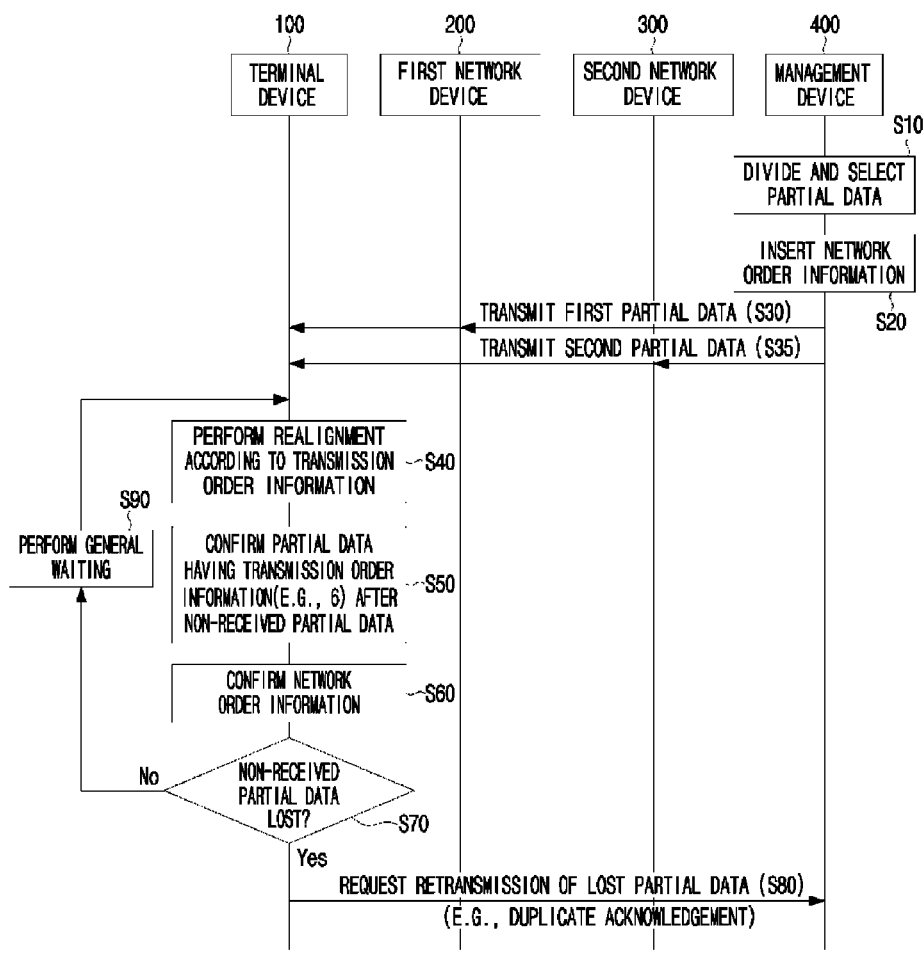
FIG. 4 is a schematic flowchart of the operation flow of a simultaneous data transmission system in a multi-network according to at least one embodiment of the present disclosure.
Figure 5:
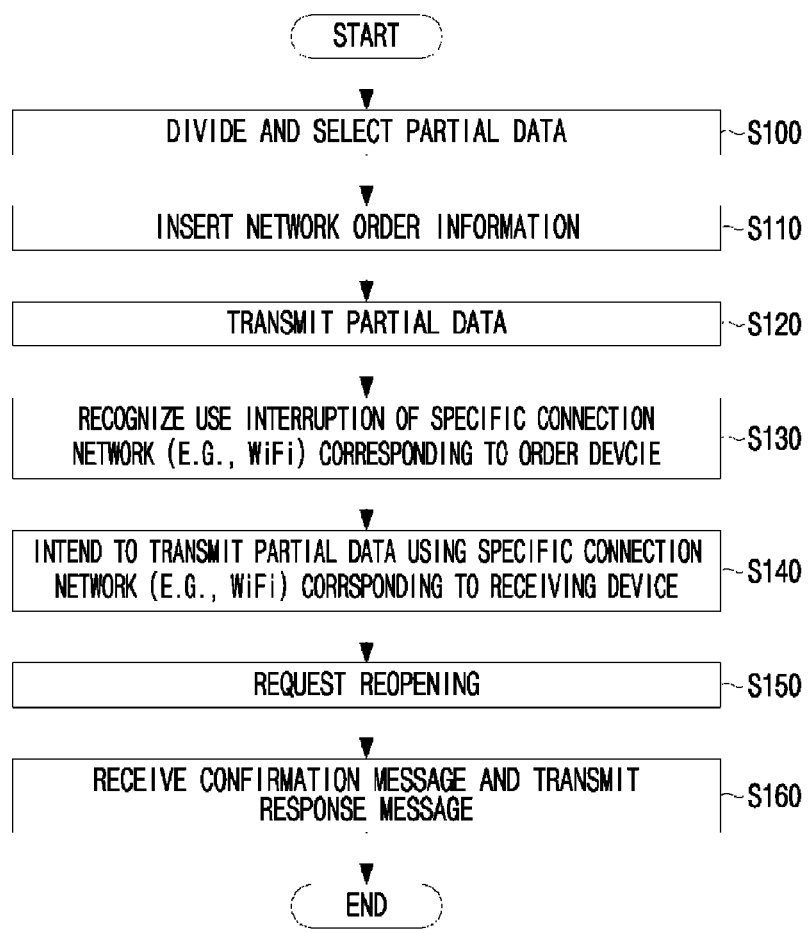
FIG. 5 is a schematic flowchart of operating a simultaneous data transmission device in a multi-network according to at least one embodiment of the present disclosure.
Figure 6:
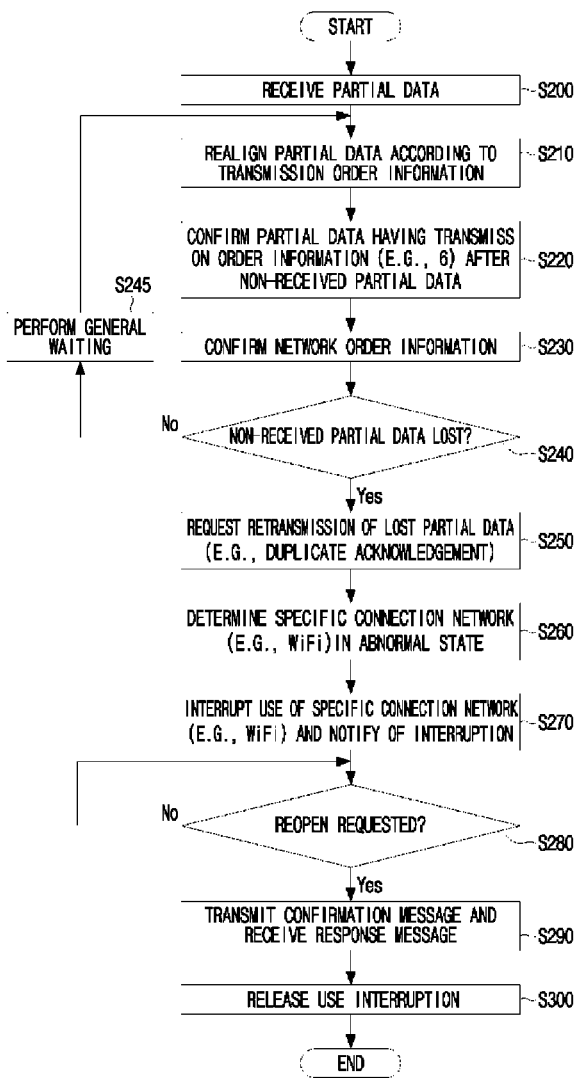
FIG. 6 is a schematic block diagram of operating a simultaneous data receiving device in a multi-network according to at least one embodiment of the present disclosure.

Hereinafter, referring to FIGS. 4 to 6, a multi-network based simultaneous data transmission method according to at least one embodiment of the present disclosure will be described. Here, for convenience in explanation, the configuration illustrated in FIGS. 1 to 3 will be described with reference to the corresponding reference numerals.

First, referring to FIG. 4, an operation flow of the multi-network based simultaneous data transmission system according to at least one embodiment of the present disclosure will be described. For convenience in explanation, explanation will be made based on a downlink in which the management device 400 is a transmitting device and the terminal device 100 becomes a receiving device. However, the present disclosure is also applied to an uplink in the same manner.

When target transmission data that is to be transmitted from the external device 500 to the terminal device 100 is received, the management device 400 divides the received data into partial data, and selects the divided partial data by connection networks (510).

The management device 400 gives or inserts transmission order information on the overall transmission order regardless of the type of the networks into the partial data that are transmitted through the connection networks (e.g., WiFi and 3G).

Then, the management device 400 inserts network transmission order information related to the transmission order of specific partial data through a specific connection network into the specific partial data selected corresponding to the specific connection network (S20).

Then, the management device 400 transmits the respective partial data selected by connection networks (e.g., WiFi and 3G) through the respective connection networks (e.g., WiFi and 3G). Specifically, a first network device 200 transmits first partial data transmitted from the management device 400 to the terminal device 100, and a second network device 300 transmits second partial data transmitted from the management device 400 to the terminal device 100 (S35).

The terminal device 100 may receive the first partial data from the first network device 200 and receive the second partial data from the second network device 300 through two or more connection networks (e.g., WiFi and 3G).

The terminal device 100 may recognize the partial data having the same identification information (e.g., virtual IP) indicating that the partial data are obtained by dividing one piece of data based on the identification information (e.g., virtual IP) included in several partial data being received, and realign the partial data in a receiving buffer based on the transmission order information included in the corresponding partial data (S40).

In this case, the terminal device 100 confirms the specific partial data having the transmission order information after the transmission order information of the non-received partial data to correspond to the respective partial data received through two or more connection networks (e.g., 3G and WiFi) (S50), and confirms the network transmission order information related to the transmission order of the specific partial data through the specific connection network through which the specific partial data is received (S60).

Then, the terminal device 100 determines whether the non-received partial data are lost based on the confirmed network transmission order information (S70).

Through this, the terminal device 100 may request retransmission of non-received partial data 5 that is determined to be lost (S80).

On the other hand, when the network transmission order information that is confirmed from the partial data of the last transmission order information among the partial data pre-received to correspond to the specific connection network and the network transmission order information that is confirmed from the specific partial data are consecutive, the terminal device 100 recognizes that the non-received partial data are transmitted through the remaining connection network except for the specific connection network among the two or more connection networks, and waits for reception of the non-received partial data.

Hereinafter, referring to FIG. 5, a method for operating a transmitting side device according to at least one embodiment of the present disclosure will be described. Here, for convenience in explanation, explanation will be made based on a downlink in which the management device 400 corresponds to a transmitting side device. However, the present disclosure is also applied to an uplink in which the terminal device 100 corresponds to the transmitting side device in the same manner.

When target transmission data to be transmitted to the terminal device 100 is received, the transmitting side device divides the received data into partial data, and selects the divided partial data by connection networks (S100).

Here, the transmitting side device may give or insert transmission order information on the overall transmission order into the respective partial data regardless of the type of the network.

On the other hand, the transmitting side device inserts the network transmission order information related to the transmission order of the specific partial data through the specific connection network into the specific partial data selected corresponding to the specific connection network (S110).

Here, the specific connection network may be one connection network selected from two or more connection networks, or may be each of the two or more connection networks. The network transmission order information related to the independent transmission order by two or more connection networks may be inserted into the respective partial data.

Thereafter, the transmitting side device transmits the partial data, into which the transmission order information and the network transmission order information are inserted, through the corresponding connection networks (S120).

On the other hand, the terminal device 100 may determine whether the non-received partial data are lost based on the network transmission order information that is inserted into the partial data, and may interrupt the reception of the partial data corresponding to the specific connection network (e.g, WiFi) that is determined to be in an abnormal state using the result of the determination.

In this case, a function for reopening the use of the interrupted specific connection network (e.g., WiFi) may be performed with respect to the terminal device 100 (S130 to S160).

More specifically, in the case of transmitting the partial data to the terminal device 100 through the interrupted specific connection network (e.g., WiFi) (S140), the transmitting side device requests the terminal device 100 to reopen the specific connection network (e.g., WiFi) (S150), and when a corresponding confirmation message is received through the specific connection network (e.g., WiFi), it transmits a response message that corresponds to the received confirmation message to the terminal device 100 (S160).

When the response message is normally received through the specific connection network (e.g., WiFi), the terminal device 100 reopens the use of the specific connection network (e.g., WiFi) of which the use is interrupted, and thus releases the reception interruption of the partial data corresponding to the specific connection network (e.g., WiFi).

Hereinafter, referring to FIG. 6, a method for operating a receiving side device according to at least one embodiment of the present disclosure will be described in detail. For convenience in explanation, explanation will be made based on a downlink in which the management device 400 corresponds to the receiving side device. However, the present disclosure is also applied to a case where the terminal device 100 corresponds to the receiving side device based on an uplink in the same manner.

Partial data that are obtained by dividing target transmission data are received from the management device 400 through two or more connection networks (e.g., 3G and WiFi) (S200).

The partial data having the same identification information (e.g., virtual IP) indicating that the partial data are obtained by dividing one piece of data based on the identification information (e.g., virtual IP) included in several partial data being received are recognized and realigned in a receiving buffer based on the transmission order information included in the corresponding partial data (S210).

Then, specific partial data having the transmission order information after the transmission order information of the non-received partial data is confirmed (S220), and the network transmission order information of the specific partial data is confirmed (S230).

The detailed determination method for determining whether the non-received partial data are lost based on the confirmed network transmission order information is as described above (S240).

Then, retransmission of the non-received partial data determined to be lost may be requested (S250).

On the other hand, when the network transmission order information that is confirmed from the partial data of the last transmission order information among the partial data pre-received to correspond to the specific connection network and the network transmission order information that is confirmed from the specific partial data are consecutive, it is recognized that the non-received partial data are transmitted through the remaining connection network except for the specific connection network among the two or more connection networks, and reception of the non-received partial data is waited for (S245).

Further, the original target transmission data are restored through combination of the respective partial data that are transferred or received from the receiving buffer according to the corresponding division order information.

On the other hand, when it is determined that the specific connection network (e.g., WiFi) is in an abnormal state based on the determination of whether the partial data corresponding to the specific connection network are lost, the use of the corresponding specific connection network (e.g., WiFi) is temporarily interrupted (S260 to S300).

That is, when the network state of the specific connection network belongs to a predetermined specific abnormal state based on the number of the non-received partial data that are determined to be lost corresponding to the specific connection network (SS260), the reception of the partial data corresponding to the specific connection network is interrupted (S270).

Thereafter, when it is requested to reopen the specific connection network (e.g., WiFi) through which reception of the partial data is interrupted (S280), a confirmation message is transmitted to the transmitting device 400 through the specific connection network, and when a response message corresponding to the confirmation message is received (S290), the reception interruption of the partial data corresponding to the specific connection network is released (S300).

In accordance with various embodiments of the present disclosure, it is promptly determined whether to continuously wait reception of the non-received partial data that are not received in the receiving device among the partial data transmitted from the transmitting device to the receiving device or to determine that the non-received data are lost during transmission and request retransmission of the non-received data. Through this, waiting time for the non-received partial data is reduced in the receiving device, and thus efficient operation of the simultaneous data transmission service is achieved Some embodiments as described above may be implemented in the form of one or more program commands that can be read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, a movable disk, optical media such as a CD-ROM and a DVD, magneto-optical media such as an optical disk, and a hardware device configured especially to store and execute a program, such as a ROM, a RAM, an EPROM memory, an EEPROM memory, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although various embodiments of the present disclosure have been described, the present disclosure is not limited to the above-described embodiments, and it will be understood by those of ordinary skill in the art to which the present disclosure pertains that various modifications and changes in form and detail are made therein without departing from the spirit and scope of the claimed invention. Further, it will be construed that such modifications and changes fall within the scope of the claimed invention. Specific terms used in this disclosure and drawings are used for illustrative purposes and not to be considered as limitations of the present disclosure.

The invention claimed is:

1. A receiving device, comprising:
a communication unit configured to receive a plurality of partial data divided from data to be transmitted through two or more connection networks;
an information confirming unit configured to confirm
(i) transmission order information indicating a transmission order assigned to each of the plurality of partial data to be transmitted through the two or more connection networks, and
(ii) network transmission order information indicating a transmission order assigned to specific partial data among the plurality of partial data to be transmitted through a specific connection network designated among the two or more connection networks; and
a control unit configured to determine whether non-received partial data are lost based on at least one of the transmission order information and the network transmission order information.

2. The receiving device of claim 1, wherein the non-received partial data include partial data that the communication unit fails to receive among the plurality of partial data through the specific connection network.

3. The receiving device of claim 1, wherein the control unit is configured to determine that the non-received partial data are lost when the network transmission order information of the specific partial data is not consecutive with the network transmission order information of other pre-received partial data previously received through the specific connection network.

4. The receiving device of claim 3, wherein the control unit is configured to
obtain a difference between the network transmission order information of said other pre-received partial data and the network transmission order information of the specific partial data, and
determine that the non-received partial data are lost when the obtained difference is equal to quantity of lost data indicated by the non-received partial data.

5. The receiving device of claim 1, wherein the control unit is configured to recognize that the non-received partial data are not lost and are instead received through another connection network among the two or more connection networks, when the network transmission order information of the specific partial data is consecutive with the network transmission order information of other pre-received partial data previously received through the specific connection network.

6. The receiving device of claim 1, further comprising:
a network interruption control unit configured to interrupt the reception of the specific partial data transmitted through the specific connection network when it is determined that the non-received partial data transmitted through the specific connection network is lost.

7. The receiving device of claim 1, wherein the control unit is configured to request retransmission of the non-received partial data.

8. A transmitting device, comprising:
a partial data selection unit configured to
divide data into a plurality of partial data, and
respectively select (a) specific partial data from the plurality of partial data to be transmitted through a specific connection network among two or more connection networks, and (b) other partial data from the plurality of partial data to be transmitted through another connection network among the two or more connection networks;
an information insertion unit configured to insert, into the selected specific partial data and said other partial data,
(i) transmission order information indicating a transmission order assigned to each of the plurality of partial data to be transmitted through the two or more connection networks, and (ii) network transmission order information indicating a transmission order respectively assigned to the specific partial data or said other partial data to be transmitted through the specific connection network or said another connection network designated among the two or more connection networks; and
a communication unit configured to transmit the specific partial data and said other partial data to a receiving device through the corresponding connection networks.

9. The transmitting device of claim 8, wherein the communication unit is configured to retransmit non-received partial data to the receiving device upon a determination that the non-received partial data are lost,
the determination based on the network transmission order information of the specific partial data received in the receiving device through the specific connection network or the network transmission order information of said other partial data received in the receiving device through said another connection network among the two or more connection networks.

10. A method for operating a receiving device, the method comprising:
receiving a plurality of partial data divided from data to be transmitted through two or more connection networks;
confirming specific partial data among the plurality of partial data received through a specific connection network among the two or more connection networks;
confirming (a) transmission order information and (b) network transmission order information included in the specific partial data,
wherein the transmission order information indicates a transmission order assigned to each of the plurality of partial data to be transmitted through the two or more connection networks, and
the network transmission order information indicates a transmission order assigned to the specific partial data to be transmitted through the specific connection network; and
determining whether non-received partial data are lost based on at least one of the transmission order information and the network transmission order information.

11. The method of claim 10, wherein the non-received partial data include partial data among the plurality of partial data that fail to be received through the specific connection network.

12. The method of claim 10, wherein the determining determines that the non-received partial data are lost when the network transmission order information of the specific partial data is not consecutive with the network transmission order information of other pre-received partial data previously received through the specific connection network.

13. The method of claim 12, wherein the determining comprises:
obtaining a difference between the network transmission order information of said other pre-received partial data and the network transmission order information of the specific partial data, and
determining that the non-received partial data are lost when the obtained difference is equal to quantity of lost data indicated by the non-received partial data.

14. The method of claim 10, wherein the determining comprises recognizing that the non-received partial data are not lost and are instead received through another connection networks among the two or more connection networks, when the network transmission order information of the specific partial data is consecutive with the network transmission order information of other pre-received partial data previously received through the specific connection network.

15. The method of claim 10, further comprising:
interrupting the reception of the specific partial data through the specific connection network when it is determined that the non-received partial data transmitted through the specific connection network is lost.

16. The method of claim 10, further comprising:
requesting retransmission of the non-received partial data when it is determined that the non-received partial data is lost.

17. A method for operating a transmitting device, the method comprising:
respectively selecting (a) specific partial data from a plurality of partial data divided from data to be transmitted through a specific connection network among two or more connection networks, and (b) other partial data from the plurality of partial data to be transmitted through another connection network among the two or more connection networks;
inserting (i) transmission order information and (ii) network transmission order information into the selected specific partial data and said other partial data,
wherein the transmission order information indicates a transmission order assigned to each of the plurality of partial data to be transmitted through the two or more connection networks, and
the network transmission order information indicates a transmission order respectively assigned to the specific partial data or said other partial data to be transmitted through the specific connection network or said another connection network designated among the two or more connection networks; and
transmitting the specific partial data and said other partial data to a receiving device through the corresponding connection networks.

18. The method of claim 17, further comprising:
retransmitting non-received partial data to the receiving device upon a determination that the non-received partial data are lost,
the determination based on at least one of the network transmission order information of the specific partial data received in the receiving device through the specific connection network or the network transmission order information of said other partial data received in the receiving device through said another connection network among the two or more connection networks.

* * * * *